United States Patent

Boström et al.

[11] Patent Number: 6,150,445
[45] Date of Patent: Nov. 21, 2000

[54] AQUEOUS CONCENTRATE OF AN ASSOCIATIVE THICKENING POLYMER, AND USE OF A NONIONIC SURFACTANT FOR REDUCING THE VISCOSITY OF THE CONCENTRATE

[75] Inventors: Peter Boström, Ytterby; Åsa Myrström, Stenungsund, both of Sweden

[73] Assignee: Akzo Nobel AV, Arnhem, Netherlands

[21] Appl. No.: 09/226,531

[22] Filed: Jan. 7, 1999

[30] Foreign Application Priority Data

Jun. 30, 1998 [SE] Sweden ................ 9802329-4

[51] Int. Cl.[7] .................................................. C08K 5/06
[52] U.S. Cl. ............................. 524/378; 524/376
[58] Field of Search .................... 524/376, 378; 536/88, 91, 95, 96

[56] References Cited

U.S. PATENT DOCUMENTS

| | | | |
|---|---|---|---|
| 4,079,028 | 3/1978 | Emmons et al. | 524/507 |
| 4,228,277 | 10/1980 | Landoll | 536/90 |
| 4,432,881 | 2/1984 | Evani | 524/375 |
| 4,988,452 | 1/1991 | Kinstedt et al. | 510/223 |
| 5,378,756 | 1/1995 | Thies et al. | 524/591 |
| 5,959,013 | 9/1999 | Conradi et al. | 524/378 |
| B1 4,228,277 | 10/1992 | Landoll | 536/90 |

FOREIGN PATENT DOCUMENTS

| | | | |
|---|---|---|---|
| 011 806 | 6/1980 | European Pat. Off. | C08F 220/28 |
| 057875 | 8/1982 | European Pat. Off. | C08L 57/00 |
| 248612 | 12/1987 | European Pat. Off. | C09D 7/12 |
| 250943 | 1/1988 | European Pat. Off. | C09D 7/12 |
| 310345 | 4/1989 | European Pat. Off. | C08G 18/08 |
| 390 240 | 10/1990 | European Pat. Off. | C08B 11/193 |
| 460896 | 12/1991 | European Pat. Off. | C09D 7/00 |
| 682094 | 11/1995 | European Pat. Off. | C09D 7/00 |
| 196 00 467 | 7/1997 | Germany | C08L 75/00 |
| 93/24577 | 12/1993 | WIPO | C09D 5/04 |
| 94/06840 | 3/1994 | WIPO | C08G 18/10 |
| 97/02325 | 1/1997 | WIPO | C09D 7/00 |

*Primary Examiner*—Peter A. Szekely
*Attorney, Agent, or Firm*—Ralphi J. Mancini; Lainie E. Parker

[57] ABSTRACT

The present invention relates to an aqueous concentrate of an associative thickening polymer, the concentrate containing a nonionic surfactant as viscosity-reducing agent. The nonionic surfactant is water-soluble and has the formula $$RO(-AO-)_{(a)}H \qquad (1)$$

wherein R is an alkyl group having 6–12 carbon atoms and AO is an ethyleneoxy or propyleneoxy group, the ratio of the ethyleneoxy groups to the total number of ethyleneoxy and propyleneoxy groups being from 1:2 to 5:6, and a is a number between 7 and 16. The presence of a small amount of the nonionic surfactant results in a surprisingly great reduction of the viscosity, which permits the formulation of concentrates having high percentages of the associative polymer without negatively affecting the properties when the concentrate is used for thickening purposes.

9 Claims, No Drawings

AQUEOUS CONCENTRATE OF AN ASSOCIATIVE THICKENING POLYMER, AND USE OF A NONIONIC SURFACTANT FOR REDUCING THE VISCOSITY OF THE CONCENTRATE

FIELD OF THE INVENTION

The present invention relates to an aqueous concentrate of an associative thickening polymer, said concentrate containing a nonionic surfactant as viscosity-reducing agent. The presence of a small amount of the nonionic surfactant results in a surprisingly great reduction of the viscosity, which permits the formulation of concentrates having high percentages of the associative polymer without negatively affecting the properties when the concentrate is used for thickening purposes.

Owing to the fact that associative thickening polymers contain hydrophobic groups, they have the capacity of forming intermolecular hydrophobic associations, and adsorbing on the surfaces of dispersed particles. As a result, the associative polymers have a much greater thickening effect than the corresponding polymer having the same molecular weight and no hydrophobic groups. It is known that associative polymers are difficult to prepare in the form of highly concentrated aqueous solutions with such a low viscosity as to allow easy pumping and dosing. A way of solving the problem is to add organic solvents, which, however, should be avoided since they are highly volatile and cause environmental problems. Another way is to add nonionic surfactants, which owing to their micelle-forming capacity can reduce the viscosity of the concentrate.

BACKGROUND OF THE INVENTION

Thus EP-A-618 243 states that a combination of a nonionic compound and an acetylene diol with triple bond results in improved viscosity. As appears from the examples, an approximate addition of 15–22% by weight of the nonionic compound and 1–5% by weight of the acetylene compound is necessary for a concentrate containing 18.5–25% by weight of an associative polymer and having a viscosity below 10,000 mPa.s to be obtained.

From EP-A-682 094 it is known to use as viscosity-reducing agent for associative polymers nonionic surfactants selected from the group consisting of ethoxylated alkyl phenols, ethoxylated alcohols and polyglycols. Even if the viscosity is essentially reduced, 20% of a nonionic surfactant is, according to Example 8, required to obtain a 25% concentrate of the associative polymer with a viscosity of 4,300 mPa.s.

EO-A-682 094 also states that anionic surfactants can be used, but they often cause undesired frothing and undesired effects in certain applications. For example, when present in colour compositions, they result in a dried colour coat with reduced water resistance.

EP-A-460 896 discloses the use of cyclodextrin to reduce the viscosity of an aqueous associative thickening agent.

From WO97/02325 it is known to use as viscosity-reducing agent for concentrates of thickening agents adducts having the formula

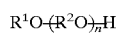

wherein $R^1$ is an aliphatic hydrocarbon group having 6–10 carbon atoms, $R^2$ is an alkylene group and n is a number between 3 and 7, whereas DE-A1-19 600 467 discloses, among other things, The use of a $C_8$ alkyl glycoside as viscosity-reducing agent. Even if the nonionic surfactants in the two last-mentioned references often have a good viscosity-reducing capacity, they have a limited water solubility and/or a tendency to frothing in aqueous compositions. The surfactants may also cause trouble such as turbidity in coating compositions and their dried layers.

An object of the present invention is to be able to prepare an aqueous concentrate of associative thickening agents having low percentages of viscosity-regulating additives, which to a small degree affect subsequent applications. They should not cause turbidity in the coating compositions and their dried layers. A further desideratum is that the additives should not cause frothing and that they should be easily biologically degradable and nontoxic.

It has now been found that these objects can be achieved by using as viscosity-reducing agent for associative thickening polymers a nonionic surfactant having a hydrophilic group consisting of ethyleneoxy groups as well as propyleneoxy groups.

SUMMARY OF THE INVENTION

The present invention relates to an aqueous concentrate of an associative thickening polymer, said concentrate containing a nonionic surfactant as viscosity-reducing agent. The presence of a small amount of the nonionic surfactant results in a surprisingly great reduction of the viscosity, which permits the formulation of concentrates having high percentages of the associative polymer without negatively affecting the properties when the concentrate is used for thickening purposes.

DETAILED DESCRIPTION OF THE INVENTION

The nonionic surfactants comprised by the invention have the general formula

wherein R is an alkyl group having 6–12, preferably 7–10 carbon atoms and AO is an ethyleneoxy or propyleneoxy group, the ratio of the ethyleneoxy groups to the total number of ethyleneoxy and propyleneoxy groups being from 1:2 to 5:6, preferably from 8:13 to 4:5, and a is a number between 7 and 16, preferably between 8 and 14. These nonionic surfactants have froth-preventing properties while at the same time they have a surprisingly good viscosity-reducing capacity. They are also readily soluble in water. This means that the surfactant, after migrating to the colour film surface, is more easily washed away in rain. As a result, the stickiness of the colour film surface and its tendency to bind carbon black and dirt are reduced.

DETAILED DESCRIPTION OF THE INVENTION

The alkyleneoxy groups of the nonionic adduct can be added at random or in blocks, or as a combination of random adding and adding in blocks. According to a preferred embodiment, first ethylene oxide is added to the alcohol, and then propylene oxide. These nonionic surfactants can be illustrated with the formula

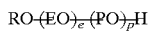

wherein R has the above meaning, EO designates an ethyleneoxy group and PO a propyleneoxy group, e and p are numbers, Σ of e and p being 7–16, preferably 8–14 and the ratio of e/e+p being from 1:2 to 5:6, preferably from 8:13 to 4:5.

The aliphatic group R can thus be branched as well as straight although branched aliphatic groups are preferred since they have surprisingly been found to give an essential contribution to the viscosity reduction. Examples of branched groups are those comprised by the formula

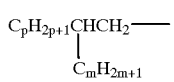 (II)

wherein m and p are at least 2 and the sum of m+p+2 is 8–10, such as 2-ethyl-hexyl or 2-propyl-heptyl; or an alkyl group, the alkyl chain containing 2–4, preferably 2–3 groups having the formula —CH(CH$_3$)— and 8–11 carbon atoms.

The nonionic surfactants of formula I can be prepared in a conventional manner. Thus, an alcohol of the formula ROH, wherein R has the above meaning, can be alkoxylated in the presence of e.g. an alkali catalyst. In the alkoxylated, use of a so-called narrow range catalyst is preferred owing to the fact that the resulting alkoxylated contains lower percentages of unreacted alcohol. If desired, also unreacted alcohol can be removed, for instance, by distillation.

The invention also concerns an aqueous concentrate of an associative polymer, the concentrate having a Brookfield viscosity, measured at 23° C. and 12 rpm, of 100–20,000 cP, preferably 200–10,000 cP. As a rule, the concentration contains 10–50, preferably 15–45% by weight of an associative polymer and 1–25%, preferably 1–15% by weight of the nonionic surfactant according to formula I. The weight ratio of the associative polymer to the nonionic surfactant usually is 15:1 to 2:1 although a higher percentage of the nonionic surfactant, e.g. up to 3:2, can be used. This may be considered when the concentrate contains very high percentages of an associative polymer, for instance, above 35% by weight.

The most common types of associative polymers are ethyleneoxy-group-containing polyurethane, block polymers, alkali-soluble acrylates, copolymers and anionic or nonionic cellulose ethers, in which hydrophobic groups, such as hydrocarbon groups, have been incorporated. The hydrophobic groups are at least two and can be located in the ends of the polymer, in the polymer chain or as groups pendant from the polymer chain. The hydrophobic groups are usually hydrocarbon groups having 6–22 carbon atoms capable of forming micelle-like aggregates. Preferred associative thickening polymers are nonionic polymers. Examples of associative polymers which are comprised by the present invention are disclosed in EP-A-11 806, EP-A-57 875, EP-A-248 612, EP-A-250 943, EP-A-310 345, EP-A-390 240, U.S. Pat. No. 4,079,028, U.S. Pat. No. 4,288,277, WO93/24577 and WO94/6840. The molecular weight of the associative polymers is suitably from 4,000 to 100,000 although polymers having a higher molecular weight can be used.

The associative polymers are as a rule used as thickening agent in binder-containing coating compositions, such as water-based paper coating agents and water-based varnish and paint compositions.

Suitable binders are emulsion binders, such as alkyd resins, and latex binders, such as polyvinyl acetate, polyacrylates, copolymers of vinyl acetate and acrylate, copolymers of vinyl acetate and ethylene, copolymers of vinyl acetate, ethylene and vinyl chloride, copolymers of styrene and acrylates, and copolymers of styrene and butadiene. The latex binders are usually stabilised with anionic surfactants. The associative polymers containing adducts of formula I have been found to be especially well suited for used in varnish and paint compositions containing latex binders.

The present invention is further illustrated by the following Examples.

EXAMPLE 1

A number of concentrates containing 20% by weight of an associative polyurethane polymer having a molecular weight of about 14,000, and a C$_{16-18}$ alkylenyl group as hydrophobic group, were prepared by mixing the polyurethane polymer with 1 mmole of a viscosity-reducing surface-active agent, based on 1 g of polyurethane polymer, and water.

The chemical structure of the viscosity-reducing additives appears from the following Table. The mixture was then stirred to achieve a homogeneous mixture, whereupon the Brookfield viscosity of the mixtures was measured at 23° C. and 12 rpm. The following results were obtained.

TABLE 1

| Test | Viscosity-reducing additive Compound | Brookfield mPa.s |
|---|---|---|
| A | — | >100,100 |
| B | C$_{12}$ alcohol + 8 EO | 14,750 |
| C | 2-ethyl hexanol + 4 EO | 3,050 |
| D | n-octanol + 5 EO | 7,150 |
| E | n-octanol + 4 EO | 6,200 |
| F | C$_8$ alkyl glycoside | 12,400 |
| 1 | 2-ethyl hexanol + 6 EO + 2 PO | 1,250 |
| 2 | 2-ethyl hexanol + 8 EO + 2 PO | 1,900 |
| 3 | 2-ethyl hexanol + 8 EO + 4 PO | 950 |
| 4 | 2-ethyl hexanol + 8 EO + 5 PO | 788 |
| 5 | 2-ethyl hexanol + 2 PO + 6 EO | 3,000 |
| 6 | n-octanol + 8 EO + 4 PO | 1,325 |
| 7 | methyl-branched[1)] C$_{10}$-alkyl alcohol + 8 EO + 4 PO | 915 |
| 8 | methyl-branched[1)] C$_{10}$-alkyl alcohol + 8 EO + 2 PO | 2,250 |

1) about 2.2 methyl groups per mole of alcohol. The results show that the compounds of formula I have a surprisingly good viscosity-reducing capacity.

EXAMPLE 2

A varnish was prepared by mixing a varnish based on a polyurethane solution containing 9 parts of water and 1 dl of the polyurethane concentrate according to tests 1–8 with 1 mmole of a surfactant per g of polyurethane according to the Table below. The resulting varnish was applied with a thickness of 200 mm on glass plates and was allowed to dry. The gloss of the varnish layers was measured against a white background by measuring the reflectance at 85° C. The clearness of the varnish was assessed visually on a scale divided into two degrees. The following results were obtained

TABLE 2

| Test | Compound | Gloss | Appearance |
|---|---|---|---|
| G | C$_{12}$ alcohol + 8 EO | 107 | clear |
| H | 2-ethyl hexanol + 4 EO | 91 | turbid |

TABLE 2-continued

| Test | Compound | Gloss | Appearance |
|---|---|---|---|
| I | n-octanol + 4 EO | 88 | turbid |
| 9 | 2-ethyl hexanol + 6 EO + 2 PO | 105 | clear |
| 10 | 2-ethyl hexanol + 8 EO + 2 PO | 104 | clear |
| 11 | 2-ethyl hexanol + 8 EO + 4 PO | 108 | clear |
| 12 | 2-ethyl hexanol + 8 EO + 5 PO | 107 | clear |
| 13 | Methyl-branched[1)] $C_{10}$-alkyl alcohol + 8 EO + 4 PO | 107 | clear |

1) about 2.2 methyl groups per mole of alcohol. As appears from the results, the inventive surfactant gave a varnish with better reflectance and appearance than the comparison surfactants in tests H and I having the same chain length.

EXAMPLE 3

In the same way as in Example 2, 20% concentrates of a commercial associative polyurethane (Serad 1100 FX supplied by Sevo Delden BV) were prepared, and the Brookfield viscosity of the concentrates was determined. The following results were obtained.

TABLE 3

| | Viscosity-reducing additive | | |
|---|---|---|---|
| Test | Compound | mmole/g polymer | Brookfield mPa.s |
| K | — | — | >100,000 |
| L | 2-ethyl hexanol + 4 EO | 1 | 2,350 |
| 14 | 2-ethyl hexanol + 6 EO + 2 PO | 1 | 1,075 |

As appears from the results, compounds of formula I according to the invention have a surprisingly good viscosity-reducing effect.

EXAMPLE 4

In the same way as in Example 2, 20% concentrates of a commercial associative polyurethane polymer (Rheolate 208 supplied by Reox Inc.) were prepared. The Brookfield viscosity of the concentrates was determined, and the following results were obtained.

TABLE 4

| | Viscosity-reducing additive | | |
|---|---|---|---|
| Test | Compound | mmole/g polymer | Brookfield mPa.s |
| M | — | — | >100,000 |
| N | 2-ethyl hexanol + 4 EO | 1 | 5,500 |
| 15 | 2-ethyl hexanol + 6 EO + 2 PO | 1 | 3,450 |

The results show that additives according to the invention reduced the viscosity of the concentrate to a considerable extent.

What is claimed is:

1. A method for reducing the viscosity of an aqueous concentrate of an associative thickening polymer which comprises adding to said concentrate an aqueous nonionic surfactant of the formula $$RO(AO)_{(a)}H \quad (I)$$

wherein R is an alkyl group having 6–12 carbon atoms and AO comprises ethyleneoxy and propyleneoxy groups, the ratio of the ethyleneoxy groups to the total number of ethyleneoxy and propyleneoxy groups being from 1:2 to 5:6, and (a) being a number from 7 to 16.

2. The method of claim 1, wherein the nonionic surfactant has the formula $$RO(EO)_e(PO)_pH$$

wherein EO designates an ethyleneoxy group and PO a propyleneoxy group, and e and p are numbers, the Σ of e+p being 7–16.

3. The method of claim 1 wherein R is an alkyl group of the formula $$C_pH_{2p+1}CHCH_2\text{—} \quad (II)$$
$$| $$
$$C_mH_{2m+1}$$

wherein m and p are at least 2 and the sum of m+p+2 is 8–10, or an alkyl group containing 2–4 groups of the formula —CH(CH$_3$)— and having 8–11 carbon atoms.

4. The method of claim 1 wherein the ratio of the ethyleneoxy groups to the total number of ethyleneoxy and propyleneoxy groups is from 8:13 to 4:5.

5. The method of claim 1 wherein the associative polymer is a polyurethane.

6. An aqueous concentrate of an associative thickening polymer, wherein the concentrate contains a nonionic surfactant of the formula $$RO(AO)_{(a)}H \quad (I)$$

wherein R is an alkyl group having 6–12 carbon atoms and AO comprises ethyleneoxy and propyleneoxy groups, the ratio of the ethyleneoxy groups to the total number of ethyleneoxy and propyleneoxy groups being from 1:2 to 5:6, and (a) being a number from 7 to 16, and the concentrate has a Brookfield viscosity, measured at 23° C. and 12 rpm, of 100–20,000 cP.

7. The concentrate of claim 6 which contains 10–50% by weight of the associative polymer and 1–25% by weight of the nonionic surfactant.

8. The concentrate of claim 6 which contains 15–45% by weight of the associative polymer and 1–15% by weight of the nonionic surfactant, and has a Brookfield viscosity of 200–10,000 cP.

9. The concentrate of claim 6 wherein the associative polymer is a polyurethane.

* * * * *

UNITED STATES PATENT AND TRADEMARK OFFICE
CERTIFICATE OF CORRECTION

PATENT NO. : 6,150,445
DATED : November 21, 2000
INVENTOR(S) : Bostrom, P., et al.

It is certified that error appears in the above-identified patent and that said Letters Patent is hereby corrected as shown below:

Title page,
Please change item [73] (Assignee) "Akzo Nobel AV" to -- Akzo Nobel NV --.

Column 6,
Line 5, change the formula "RO $(-(AO)_{(a)}H$" to -- RO $(AO)_{(a)}H$ --.
Line 16, change the formula "RO $(-(EO)_e(PO)_pH$" to -- RO $(EO)_e(PO)_pH$ --.

Signed and Sealed this

Thirteenth Day of November, 2001

Attest:

NICHOLAS P. GODICI
Attesting Officer
Acting Director of the United States Patent and Trademark Office